United States Patent [19]

Prudhon

[11] Patent Number: 4,910,008

[45] Date of Patent: Mar. 20, 1990

[54] GAS-GAS PHASE CONTACTOR

[75] Inventor: Francois Prudhon, Versailles, France

[73] Assignee: Rhone-Poulenc Chimie de Base, Courbevoie, France

[21] Appl. No.: 296,926

[22] Filed: Jan. 11, 1989

Related U.S. Application Data

[63] Continuation of Ser. No. 29,385, Mar. 23, 1987, abandoned, which is a continuation of Ser. No. 754,016, Jul. 11, 1985, abandoned.

[30] Foreign Application Priority Data

Jul. 11, 1984 [FR] France ................. 84 11002
Jul. 24, 1985 [FR] France ................. 85 06218

[51] Int. Cl.$^4$ ............................................... C01B 7/01
[52] U.S. Cl. ................................... 423/487; 423/650; 423/DIG. 7; 422/129; 422/224; 431/2
[58] Field of Search ......... 423/487, 481, 650, DIG. 9; 422/129, 224; 431/2

[56] References Cited

U.S. PATENT DOCUMENTS

| | | | |
|---|---|---|---|
| 1,184,576 | 5/1916 | Scherbel | 423/487 |
| 1,238,734 | 9/1917 | Averill | 423/458 |
| 2,295,591 | 9/1942 | Maude | 423/487 |
| 2,368,827 | 2/1945 | Hanson et al. | 423/458 |
| 2,413,420 | 12/1946 | Stephanoff | 34/10 |
| 2,785,054 | 3/1967 | Bethea et al. | 423/456 |
| 2,890,929 | 6/1959 | Rummert | 423/487 |
| 2,989,380 | 6/1961 | Weis et al. | 422/129 |
| 3,340,010 | 9/1967 | Selfridge | 423/456 |
| 3,490,870 | 1/1970 | Deland | 423/456 |
| 3,532,462 | 10/1970 | Zirngibl et al. | 423/613 |
| 3,701,827 | 10/1972 | Dahmen | 423/456 |
| 3,988,427 | 10/1976 | Bossier, III et al. | 423/487 |
| 4,246,232 | 1/1981 | Posch | 423/458 |

FOREIGN PATENT DOCUMENTS

| | | | |
|---|---|---|---|
| 2366517 | 4/1978 | France | 423/579 |
| 2508818 | 7/1981 | France | 423/307 |
| 2488525 | 3/1982 | France | 34/10 |
| 1438057 | 6/1976 | United Kingdom | 423/462 |

*Primary Examiner*—Anthony McFarlane
*Attorney, Agent, or Firm*—Burns, Doane, Swecker & Mathis

[57] ABSTRACT

A gas-gas phase contactor/process, especially adopted for high temperature reactions, e.g., for the production of hydrochloric acid, comprises means for separately establishing at least two disparate gaseous feedstreams, means for disintegrating each such feedstream into a registered plurality of substreams thereof, one of each such substream being complementary to at least one other, and means for establishing homogeneous unit volumes of gaseous reaction mixture which comprise said complementary fractions of each such disintegrated feedstream.

13 Claims, 5 Drawing Sheets

GAS-GAS PHASE CONTACTOR

This application is a continuation of application Ser. No. 029,385, filed Mar. 23, 1987, now abandoned, which is a continuation of U.S. Ser. No. 754,016 filed July 11, 1985, now abandoned.

BACKGROUND OF THE INVENTION

1. Field of the Invention

The present invention relates to process/apparatus for carrying out reactions between at least two gaseous phases, in particular at high temperature and, more particularly, for the direct synthesis of hydrochloric acid.

2. Description of the Prior Art

It is known to this art that, typically, reactions featuring gas-liquid contact give rise to a problem as regards the quality or efficacy of the contacting between such plural, disparate phases.

In French Patent No. 2,257,326, it was first proposed to form pairs, each constituted of an element of volume of liquid and an element of volume of gas, in accordance with which a given assemblage of trajectories was established for contacting substances which therefore occur in different phases, wherein at least one gaseous phase serves to form an axially symmetrical helically spinning flow configuration, and at least one liquid phase is introduced along the axis of symmetry of said axial flow-vortex flow configuration, into the region in which there is a relative depression in said axial flow-vortex flow configuration, the momentum of the elements of volume of the axial helically spinning flow configuration with respect to that of the elements of volume of the axial phase being such that said axial spinning flow configuration causes the axial phase to be distintegrated, dispersed and entrained, and possibly treated by the axial spinning flow configuration within the associations of elements of volume of the disparate phases (gas-liquid pairs) which are thus formed.

The momentary existence of such "donor-acceptor pairs" of energy and/or matter was utilized (French Patent No. 2,508,818) to provide for selective distribution of energy based upon virtually instantaneous, systematic and oriented distribution of the particles by and throughout the driving gas:

(i) virtually instantaneous because it corresponds to conditions of high-energy mixing (ratio between the initial amounts of momentum);

(ii) systematic because it associates an element of the driving gas with each element of fluid, initially axial, without omission or repetition, and (iii) oriented because it defines an origin of the treatment and an initial trajectory which are common to the driving gas and to the elements of the other fluids which are entrained.

The reactions which take place at high temperature constitute an attractive aspect for prospective application of such concept.

The method heretofore employed by the assignee hereof in the case of gas-liquid contact makes it possible to supply the energy necessary to establish the beginning of the main reaction in the gaseous phase by way of the initial gaseous phase. The time required for creation, systematic distribution and vaporization of the reactants of the initial liquid is thus utilized to produce a homogeneous mix of the initial gas and the vapor of the liquid on a scale and under physical-chemical conditions such that the principal reaction in gaseous homogenous phase may take place under optimum conditions.

The above-indicated time may be considered as corresponding to a delayed effect, the advantage of which may be taken in the case of gas-liquid contact.

On the other hand, in that situation wherein the reactants are supplied in gaseous state, the problem which arises is that of obtaining the same quality of intimately admixing the substances which are to be brought together, as in the case of contact between a gaseous phase and a liquid phase in accordance with the aforesaid process, before the commencement of the particularly rapid reaction in the gaseous phase.

Also to be considered is the fact that it is deliberately intended to conduct such operations at elevated temperatures and therefore within ranges where the reaction speeds are even faster, which may result in local incompatible distortion phenomena on the reaction profiles in regard to levels of concentration and therefore temperatures.

SUMMARY OF THE INVENTION

Accordingly, a major object of the present invention is the provision of improved process/apparatus for interreaction between gas-gas phases, the same being comparable to reactions of gas-liquid type, as hereinbefore described, and said phases being initially gaseous.

Briefly according to the invention, at least two separate gas flows, or phases, are injected into a mixing zone in which:

(a) by pre-dividing or subdividing each flowstream, a plurality or repetitive units of elementary reaction mixtures are formed from said pre-divided flowstreams, and (b) advantageously, there is imparted to the elementary reaction mixtures an overall movement of entrainment from at least one of the flowstreams serving to form the elementary mixtures.

DETAILED DESCRIPTION OF THE INVENTION

More particularly according to the present invention, featured is the formation or establishment of homogeneous unit volumes of homogeneous elementary reaction mixtures prior to the commencement of reaction, which reaction is all the faster insofar as it takes place between gaseous phases. Said homogeneous elementary reaction mixtures must, therefore, be constituted within a period of time, the length of which decreases in proportion to an increasing speed of reaction.

The gases being available at a given pressure and therefore at a given speed of injection, the elementary mixtures are constituted all the more rapidly in that same occurs on a small scale.

The range of a jet on issuing or injection from an orifice being proportional to the diameter of the orifice and independent of the flow chart, the plurality of means for generating the elementary mixtures will therefore advantageously comprise closely adjacent orifices having small dimensions.

In practice, in a simple embodiment of the invention, each flowstream of gas is pre-divided or preliminarily disintegrated by means of a plurality of injectors, such as pairs of adjacent orifices.

Such units, which are repetitive from a geometrical point of view, must also be repetitive from a hydrodynamic point of view, providing for equal distribution of the flowstreams. That effect is achieved by imparting to the speed of ejection $V_e$ of a gas through the orifices which are allotted thereto in said repetitive or plurality of units, a value which is equal to at least three times and preferably six times the value of the speed of distribution $V_d$ upstream of said orifices, in the case of air, under normal conditions of temperature and pressure.

Such effect, therefore, establishes the homogeneous pattern of unit volumes of homogeneous elementary reaction mixtures in a state of admixture comparable to that observed at the outlet of a delayed effect zone as described hereinbefore in relation to gas-liquid mixtures.

A symmetrical vortex movement is advantageously imparted to at least one of the flowstreams, the symmetrical vortex movement having a sufficient flow rate to effect entrainment of the other gaseous flowstream (or flowstreams).

Then, disposed at a downstream location is a restricted space, a confinement zone or zone of restricted flow passage, such as to effect a rotary movement of the flowstream about the axis of the subsequent flow configuration, to perform the function of overall entrainment.

That mode of operation makes it possible to achieve, on the apparatus scale, very rapid mixing of the elementary reaction mixtures obtained by reason of the plurality of feed injection means, and the commencement of the reaction without omission or repetition, hence providing a high level of density of discrete reactions in a minimized total volume.

The aforesaid permits miniaturization of the equipment/apparatus with reduced wall surface effects, thus providing for effective thermal protection by cooling of the walls without a noticeable effect on the mean temperature of the reaction. The result of that is that it is possible to rapidly attain very high temperatures under the optimum conditions as regards safety and reliability, and to achieve particularly attractive levels of selectivity.

However, when, for example, gaseous compositions comprising hydrocarbons are treated, deposits of carbon may form on the walls of the reaction zone.

In fact, combustion of a hydrocarbon in the gaseous state in a given combustion supporting material or agent results in solely gaseous reaction products (generally $H_2$, $H_2O$, $CO$ and $CO_2$) if a number of conditions are combined together:

(1) initial mixing between the fuel and the combustion supporting agent must be rapid, homogeneous and result in a temperature upon completion of the mixing phase (before or during the commencement of the reactions) such that the mixture can ignite and the said reactions can be sustained (preheating required under certain conditions) and that the polyphase decomposition reactions of the type $CH_4 \rightarrow C + 2H_2$ are immediately followed by further complementary combustion or reduction reactions, at markedly higher relative speeds (reactions of the following types: $C + O_2 \rightarrow CO_2$, $H_2 + \frac{1}{2}O_2 \rightarrow H_2O$, $C + CO_2 \rightleftharpoons 2CO$, $C + H_2O \rightleftharpoons CO + H_2$);

(2) the amount of combustion supporting agent must be sufficient to permit the reactions to be completely carried out, without therefore leaving any traces of the solid product which is transiently formed (carbon from thermal decomposition, in particular).

Such conditions are necessary. They are sufficient in the gas phase if mixing is fairly rapid and properly carried out. On the other hand, the volume in which the reactions occur is obviously limited by the wall members of the reaction zone. If the apparatus generally is designed for very hot operation, therefore at high reaction speeds, the "initial free movement" of the molecules (between their injection, through the mixing zone, to their first encounter with a wall) is voluntarily short (the required effect of confining the jets and reducing the wall surface effects). If, at the end of the above-indicated movement, there are still molecules of fuel in their initial state (simply in the course of being heated), the may temporarily be part of the laminar boundary gas layer which covers the reactor wall, the location at which mixtures then occur virtually only by a diffusion effect, where the component of the turbulence perpendicular to the wall is virtually zero and where the gases and, in particular, the fuel are therefore rapidly raised, essentially by conduction, to a temperature close to that of said wall, with locally a very slight probability of contacting molecules of combustion supporting agent.

In that case, if the wall is at a temperature exceeding the thermal decomposition temperature of the hydrocarbon, as the hydrocarbon has very little chance of locally encountering combustion supporting agent, the hydrocarbon will be cleaved into carbon and hydrogen, for example, the solids fraction (the carbon) of those compounds then being subjected to different dynamics from the gaseous compounds (accelerations, electrostatic forces and, finally, possible deposit of solids on the wall surface).

Such being the case, it is thus possible according to the present invention for that disadvantage to be remedied in a simple manner by maintaining the walls which define the mixing zone at a sufficiently low temperature as to practically avoid local decomposition of the products of reaction, such as hydrocarbons.

The process according to the present invention is therefore characterized by the contacting of at least two compounds in gaseous state, comprising injecting at least two separate gaseous flowstreams into a mixing zone where, by first predividing each flowstream, repetitive or a plurality of units of elementary reaction mixtures are formed from said pre-divided flows, at least one of said subdivided gaseous flowstreams comprising at least one hydrocarbon and the mixture being raised to a temperature causing dissociation of the hydrocarbons and possibly reaction thereof with other compounds in a restricted space (a confinement zone) defined by the lateral sidewalls of the contactor, the temperature of said walls being maintained sufficiently low as to avoid local decomposition of the products in the presence of said mixture.

It is believed that the molecule of hydrocarbon, over the course of being heated and which has not yet encountered combustion supporting agent before approaching the reactor sidewalls, if it is momentarily entrapped in the above-described laminar boundary layer, attains a temperature, due to the same conduction effects as those referred to above (again, approximately the temperature of said sidewall), which is lower than the temperature of decomposition of said hydrocarbon. In the local absence of combustion supporting agent, the cold wall therefore "neutralizes" the tendency to evolve towards decomposition procedures (in particular into solid C), which evolution will re-appear subsequently when the hydrocarbon molecule exits the cold protective boundary layer to be re-injected into the hot mixture, carbon production then occurring in a hot atmosphere of oxygen (combustion) or $CO_2$ and/or $H_2O$ (reduction to CO and $H_2$). This apparatus of this invention therefore combines the advantages of a cold wall (including its strength in the presence of hot gases), and a reaction at high temperature.

Figure 1:
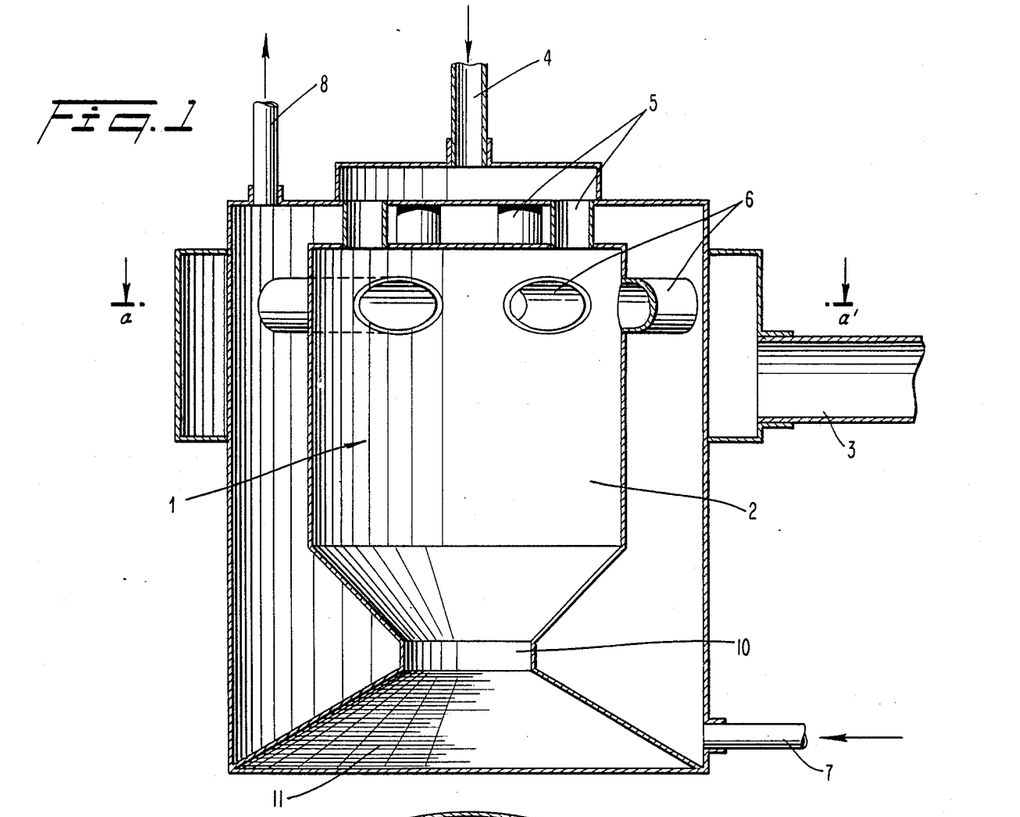
FIG. 1 is an axial, diagrammatical cross-sectional view of one embodiment of the apparatus according to the invention.

Now referring specifically to the Figures of Drawing, the apparatus of the invention, as shown in FIG. 1, comprises a head 1 provided with at least two complementary series of gas feeds issuing from two gas feed inlet manifolds 3 and 4, and a chamber 2 into which the gas feeds open (the same advantageously being injection orifices).

This apparatus is characterized in that the series of gas feeds are disposed as to constitute a plurality of pairs of complementary inlet parts, or repetitive inlet means 5 and 6 for forming the elementary reaction mixture.

Advantageously, at least one of each of said complementary pairs, or unit 5 and 6, defines an inlet passage adopted to impart a tangential flow to the inlet gas stream with respect to the main axis of the subsequent flow configuration.

Figure 2:
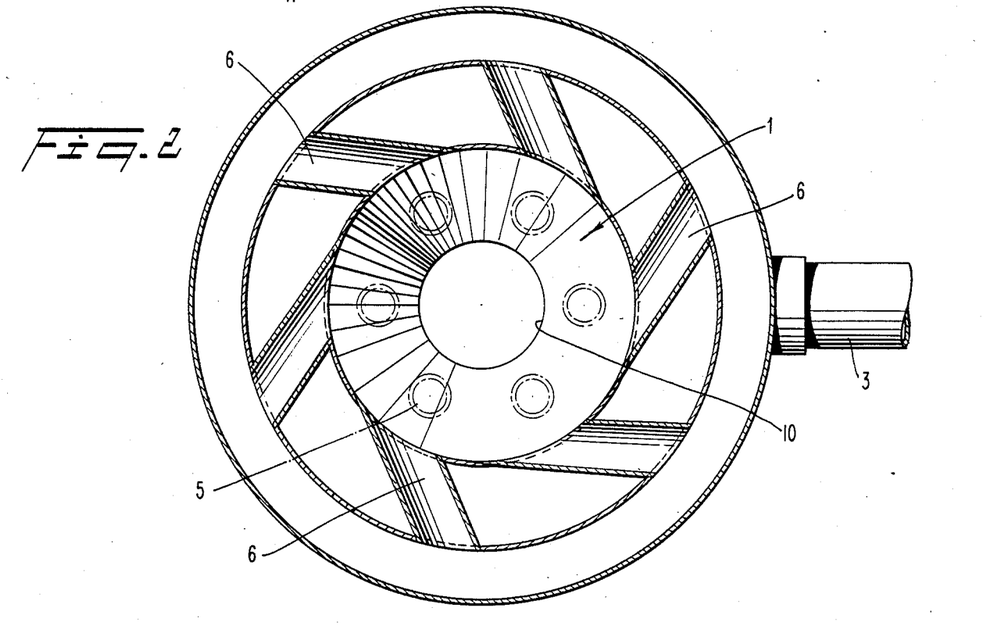
FIG. 2 is a cross-sectional view taken along the line a—a' of FIG. 1.

FIG. 2 is a cross-section of the apparatus of FIG. 1, taken along the line a—a'.

The sidewall assembly, as described hereinbefore and also shown in FIG. 1, may advantageously be cooled by a circulating thermostatic fluid, in particular water. The conduits 7 and 8 diagrammatically represent the inlet and the outlet of said fluid, as one example.

In accordance with one embodiment of the invention, the apparatus is provided with means for regulating the temperature of the sidewalls by means of a thermostatically controlled fluid, to set it at a sufficiently low value to avoid decomposition and/or local reaction at the wall surface of the hydrocarbons in the mixture.

In a simple embodiment, said temperature regulating fluid may comprise the fluid which enters and exits by way of the aforesaid conduits 7 and 8.

Figure 7:
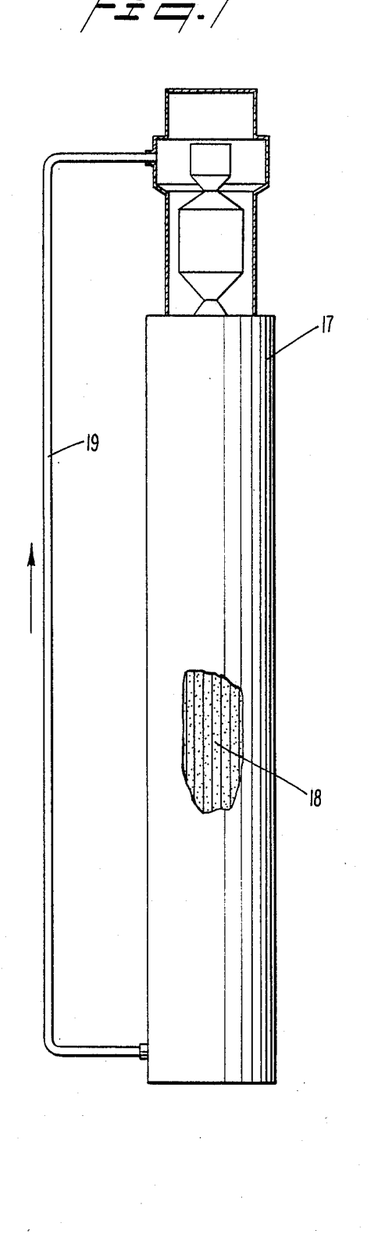
Figure 8:
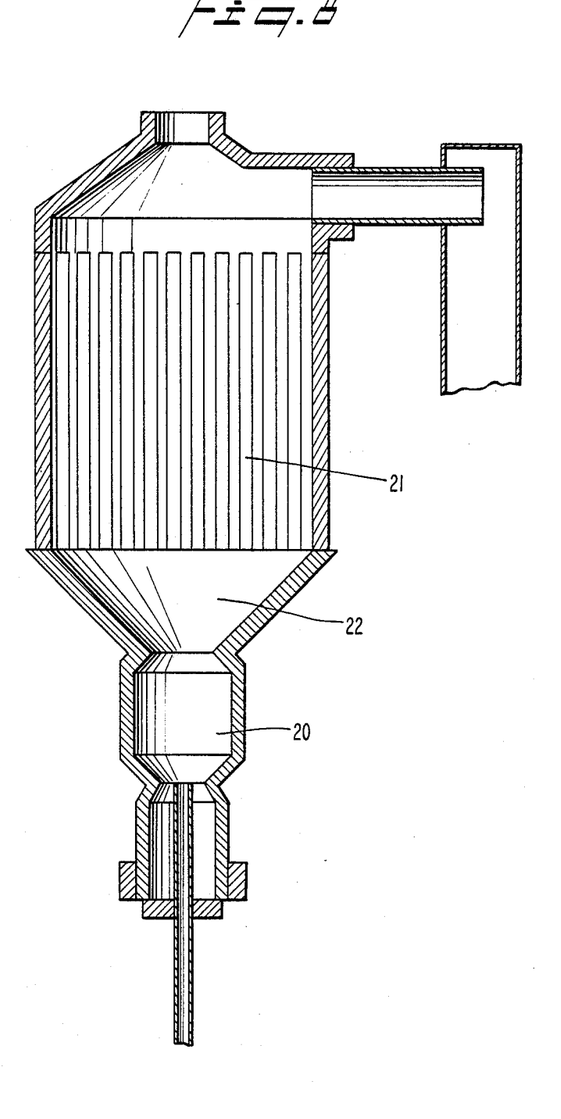
Figure 9:
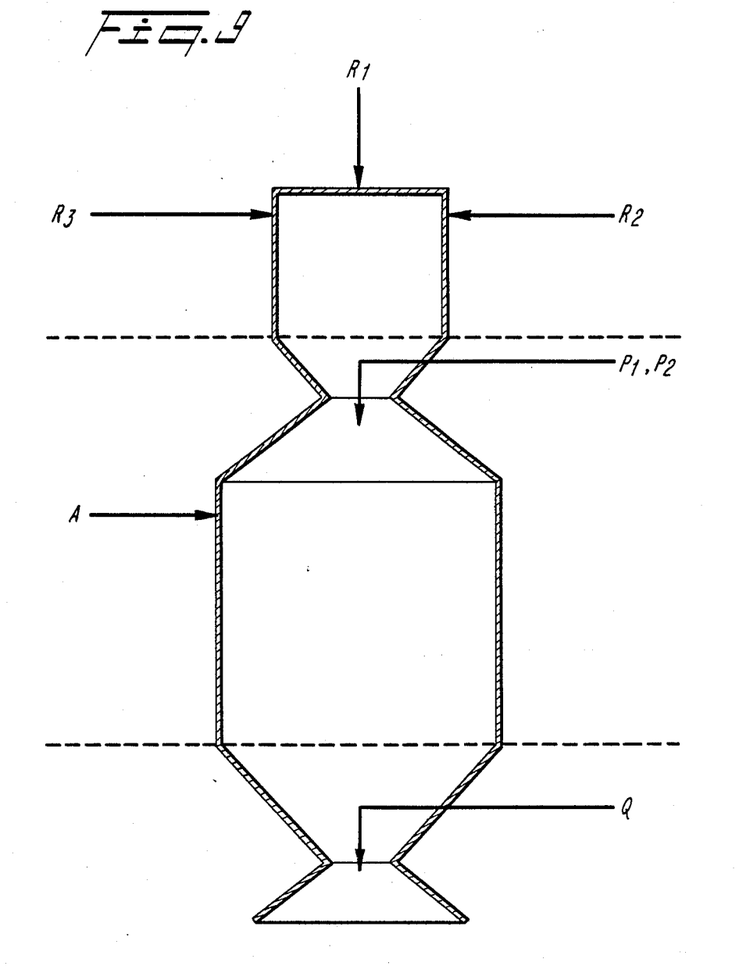
FIG. 9 is a schematic/diagrammatic representation of yet other embodiments of the process/apparatus according to the invention.

FIGS. 3 to 8 illustrate other embodiments, while FIG. 9 is a diagrammatic view of various possible operating methods.

Figure 3:
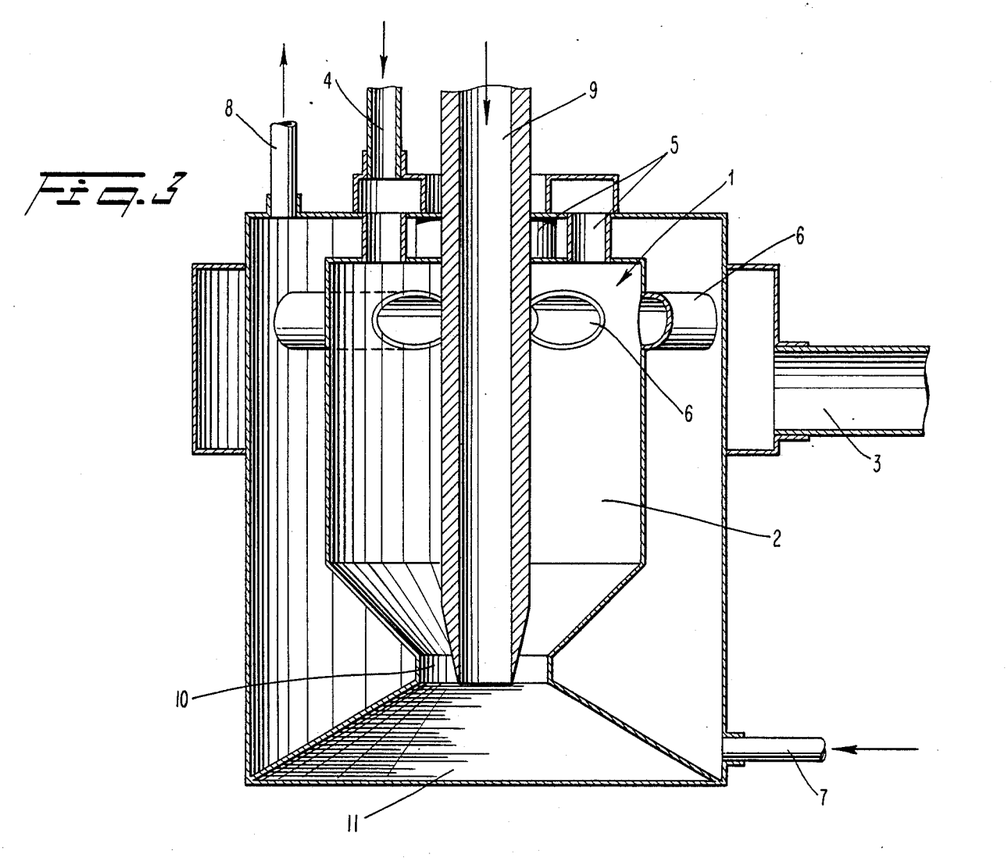
FIG. 3 is an axial, diagrammatical cross-sectional view of another embodiment of the apparatus according to the invention.

In the embodiment illustrated in FIG. 3, a third fluid (axial phase) is supplied by means of the inlet conduit 9, which is advantageously also cooled; the conduit 9 opens in the vicinity of the plane of the zone of restricted flow passage 10, at the outlet from the chamber 2. The third fluid may be gaseous or liquid; it may possibly be charged, and it can be sprayed at 11 by transfer of the mechanical and thermal energy of the gases from 3 and 4 having reacted in 1 and 2, said gases having had imparted thereto a momentum, upon entering the diverging zone 11, which is at least 100 times the momentum of the axial phase (conduit 9) and advantageously from 1000 to 10,000 times the value thereof when said axial phase is liquid, or in the form of a sprayable suspension, such conditions causing the axial phase to be disintegrated and dispersed, then entrained in and treated by the gaseous phase emanating from chamber 2, under conditions described in particular in French Patent Nos. 2,257,326 and 2,508,818. A plurality of coaxially introduced fluids may be introduced into 11 (in that case, reference numeral 9 represents a plurality of coaxial conduits).

A particular embodiment of treatment which is carried out in that amount at zone 11 is hereby designated vaporizing atomization, or "pulvaporization", an organized combination in the flow configuration confined in zone 11, and referred to as an "axially symmetrical helically spinning flow configuration" of the mechanical and thermal effects of the gaseous phase upon the generally liquid axial phase.

Figure 4:
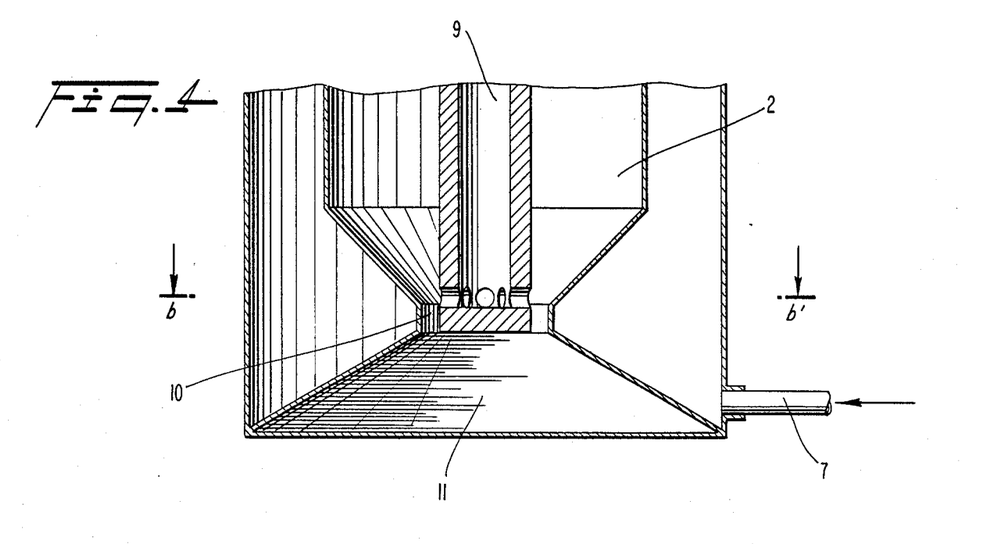
FIG. 4 is an axial, diagrammatical cross-sectional view of still another embodiment of the apparatus according to the invention.
Figure 5:
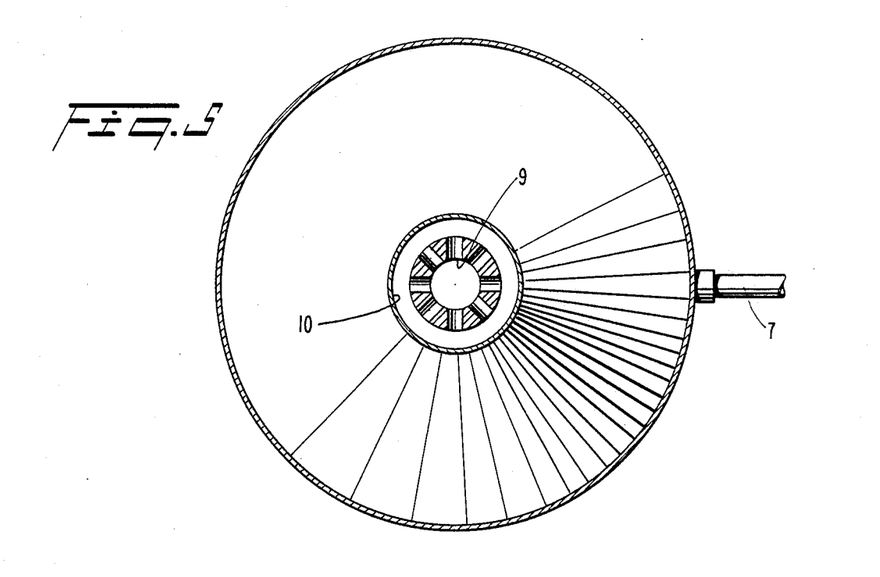
FIG. 5 is a cross-sectional view along the line b—b' of FIG. 4.

When the axial phase is gaseous, a particularly advantageous arrangement in respect of the downstream end of the conduit 9 is shown in FIGS. 4 and 5 which illustrate application of the principles, of pre-dividing the jet of the axial phase, which in practice produces repetitive units of elementary reaction mixtures in the associated streams of the driving gases which emanated from chamber 2, in accordance with the particular flow configuration generated in head 1, and then by the reaction which occurred in chamber 2.

When all of the phases are injected in the gaseous state, the procedure does however still remain within the ambit of the invention, if no tangential movement is imparted to the elementary reaction mixtures, with respect to the longitudinal axis of symmetry of the downstream flow configuration.

The aforedescribed apparatus may be fabricated from any suitable material, such as metals, graphite, and the like.

Figure 6:
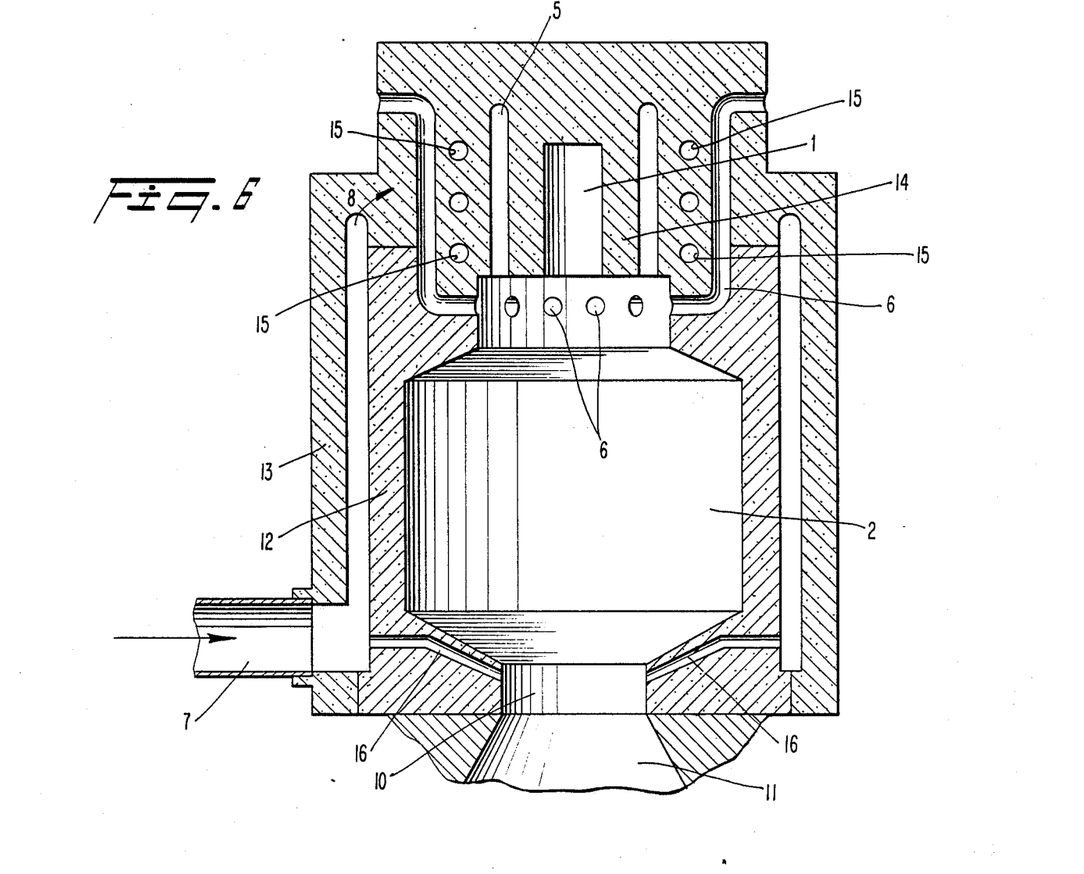
FIGS. 6–8 are axial, diagrammatical cross-sectional views of other embodiments of the apparatus according to the invention.

FIG. 6 depicts a construction fabricated from graphite. The casing 13 of the outer body is of impregnated graphite for fluid-type purposes, its internal casing 12 is of porous graphite (non-impregnated). The porous nature imparts thereto thermal protection due to the phenomenon of liquid passing through the graphite by virtue of the porosity thereof.

The head 1 of the subject apparatus is provided for distributing the gaseous phases through the ports 5 and 6 as in FIGS. 1, 2 and 3, and additionally comprises the arrangement for the cooling circuit 7 and 8 in the form of conduits 15 provided in the member 14 which is adapted to the particular technology of graphite construction.

That apparatus may be used in many situations.

A first situation features, in particular, hydrogen and chlorine as the gaseous reactants, either for the synthesis of hydrochloric acid under stoichiometric reaction conditions, to within about 5%, or, in contrast, with an excess of one reactant or the other.

Now, it is known to the art that the problems associated with the synthesis of hydrochloric acid are particularly severe.

Nonetheless, by means of the present invention it is possible to use apparatus therefor which is substantially smaller for the same production level.

Such apparatus according to the invention is charged with chlorine via manifold 3 and with hydrogen via manifold 4.

The repetitive or plurality of injection units are defined by the several complementary pairs or couples 5 and 6. The entire apparatus is cooled by the circuit 7 and 8 which is fed with water in the event of metal construction (FIGS. 1 to 3) and a solution of hydrochloric acid in the event of graphite construction (FIG. 6).

The aforedescribed apparatus is mounted upstream of a column 17 provided with a heat exchanger 18 (see FIG. 7).

Quenching is effected directly by a solution of hydrochloric acid which is recycled from the bottom of the column 17 by means of a recycling loop conduit 19.

Quenching of the combustion gases is effected at the situs of the zone of restricted flow passage 10, either from ducts 16 in the case of a graphite apparatus (as in FIG. 6) or from a conduit 9 in the case of a metal construction (FIG. 3).

The exchanger 18 is advantageously fabricated from graphite.

In a particularly advantageous embodiment of the present invention, the concentration of the recycled acid may be made fairly high, and its temperature may be correspondingly reduced, such that the acid then serves only the function of a thermal fluid without any absorption effect.

The gas formed by the combustion of chlorine and hydrogen is then simply washed and cooled in a state of physical-chemical equilibrium with the liquid, then delivered directly to the location at which it is to be used.

Employing the same apparatus, it is also possible to use chlorine which is diluted by inert gases such as a chlorine liquefaction installation purge, the rate of flow of the hydrogen then being consequentially adjusted.

It is also possible to use the apparatus according to the invention, in accordance with a diagrammatic view as illustrated in FIG. 3, by supplying it with an excess of chlorine and introducing an axial liquid phase other than hydrochloric acid by way of the conduit 9 at the level of the zone of restricted flow passage 10.

If the axial liquid phase is a fuel or combustible material such as a hydrocarbon, that provides (at 11), therefore, for direct chlorination to form chlorinated solvents without the necessity for a conventional intermediate step entailing the use of ethylene.

In the opposite case, where the apparatus according to the invention is operated with an excess of hydrogen with respect to the stoichiometry of $H_2 + Cl_2$, it is possible (at 11) to carry out the hydrogenation of heavy hydrocarbons which either may or may not be chlorinated.

It will of course be appreciated that the process and the apparatus according to the invention are not limited to reactions involving chlorine and hydrogen.

The apparatus may be supplied with air via manifold 3 and natural gas via manifold 4, with chlorinated solvents being injected via inlet 9, for example, of residual origin, then being subjected at zone 11 to the vaporizing atomization effect which makes it possible to provide for the total combustion thereof in an apparatus as illustrated in FIG. 8 which depicts a design that particularly clearly illustrates the qualities and advantages of the process of the invention.

By virtue of the miniaturization of the apparatus, the furnace which normally follows the burner is reduced to the dimension of a simple hearth 20. The hearth, with a very high level of energy density, may have thermostatically controlled metal walls. It will be appreciated that this apparatus, like those described above, either may or may not include a quenching arrangement.

In the apparatus shown in FIG. 8, a boiler 21 is downstream of the hearth 20, being connected thereto via a diverging conical zone as indicated at 22.

The foregoing applications are obviously only representative and not limiting.

Summarized in the following Table is a certain number of applications offered by the invention, also with reference to the Figures already described and to FIG. 9.

In FIG. 9:

$R_1$, $R_2$ and $R_3$ represent the feed supplies of gas and therefore correspond to manifolds 3 and 4 in the other Figures and $P_1$, $P_2$ represent the axial phase feed supplies.

Also in FIG. 9, A illustrates an option of supply in respect of gaseous phase and Q in respect of a liquid phase, in particular for quenching or wetting.

FIG. 9 therefore illustrates a generalization of the process/apparatus of the invention.

It will be appreciated that the process and the apparatus of the invention are applicable to other uses involving the treatment of a gaseous or optional liquid phase which may be atomized.

In particular, they may be utilized for pollution abatement.

In FIG. 9, a supply of gas ($R_1$, $R_2$, $R_3$) or optional fluid which may be atomized ($P_1$, $P_2$) may in particular comprise a phase which is to be cleansed or stripped of polluting contaminants.

TABLE

| No. | APPARATUS SUPPLIED WITH | | | PHYSICAL-CHEMICAL REACTIONS | | REMARKS |
|---|---|---|---|---|---|---|
| | 3 | 4 | 9 | at 2 | at 11 | (Cf FIG. 9) |
| 1 | Air and/or $O_2$ | $H_2$ | Nil and/or vapor and/or liquid $H_2O$ | Combustion $H_2$ in $O_2$ | Generation of superheated water vapor (or hot gases) | Optional $P_1$, $P_2$ via conduit 9 |
| 2 | Air and/or $O_2$ | Gaseous HC (or $H_2$) | Nil | Combustion HC (or $H_2$) in $O_2$ | Generation of hot gases | Optional $P_1$, $P_2$ via conduit 9 |
| 3 | Air and/or $O_2$ | Gaseous HC (or $H_2$) | Solution or suspension | Combution HC (or $H_2$) in $O_2$ | Concentration, drying or thermal treatment of the axial phase ($P_1$, $P_2$) | Optional $P_1$, $P_2$ via conduit 9 |
| 4 | Air and/or $O_2$ | Gaseous HC (or $H_2$) | Liquid HC and/or fine solid combustible dispersible in | Combustion HC (or $H_2$) in $O_2$ | Combustion by "pulvaporization" of the axial phase and | Optionally, quenching at Q |

4,910,008

TABLE-continued

| | APPARATUS SUPPLIED WITH | | | PHYSICAL-CHEMICAL REACTIONS | | REMARKS |
|---|---|---|---|---|---|---|
| No. | 3 | 4 | 9 | at 2 | at 11 | (Cf FIG. 9) |
| | | | "fluidized transport" (water, liquid HC, $CO_2$ and/or gas ... $^{2)}$) | | possible make-up of combustion supporting agent at 11 | |
| 5 | Air and/or $O_2$ | Gaseous HC (or $H_2$) | Liquid HC | Combustion $H_2$ in $O_2$ with $H_2$ in excess | Hydrosteam cracking of 9 | Optionally, quenching at Q |
| 6 | Air and/or $O_2$ | Gaseous HC (or $H_2$) | Advantageously $CH_4$ | Combustion $H_2$ in $O_2$ with $H_2$ in excess | Production of $C_2H_2$ | 9 as in FIGS. 4 and 5 Q immediately downstream of 11 (very short residence time in 11) |
| 7 | Air and/or $O_2$ | Gaseous HC (or $H_2$) | | Combustion HC and/or $H_2$ in $O_2$ with excess of $O_2$ (and/or air) | Combustion of the organic residues and separation of any salts | Separation of the dry salts (filters) or Q for washing the cleansed salts |
| 8 | Air and/or $O_2$ | Gaseous HC (or $H_2$) | Residual solvents which may or may not be chlorinated, brominated or fluorinated | Combustion HC and/or $H_2$ in $O_2$ with excess of $O_2$ (and/or air) | Combustion with production of HCl, HBr or HF | $P_1P_2$, etc ... may contain dioxin or precursors (e.g., chlorobenzenes), Q for quenching, avoiding the presence of free halogens in the effluents |
| 9 | $Cl_2$ as issuing from hydrolysis or "inerts" from liquefaction of $Cl_2$ | Slight excess of $H_2$ | Water, dilute hydrochloric solution or hydrochloric solution whose concentration is in equilibrium in 11 with the gases at the temperature attained | $Cl_2 + H_2 \rightarrow 2$ HCl + slight excess of $H_2 \rightarrow$ HCl gas | Absorption of HCl in water in the dilute solution and/or cooling of the HCl gas obtained | — |
| 10 | $Cl_2$ as issuing from hydrolysis or "inerts" from liquefaction of $Cl_2$ | Slight excess of $H_2$ | Aqueous solution $P_2O_5$ | $Cl_2 + H_2 \rightarrow 2$ HCl + slight excess of $H_2 \rightarrow$ HCl gas | Concentration of $P_2O_5$ | Relates in particular to the solutions of $P_2O_5$ produced by hydrochloric attack on phosphates |
| 11 | $Cl_2$ diluted by the inerts of a liquefaction operation | $H_2$ in excess with respect to the chlorine and to $O_2$ of the inerts | Hydrochloric solution by cooling and absorption | $Cl_2 + H_2 \rightarrow 2$ HCl + slight excess of $H_2 \rightarrow$ HCl gas (+ inerts) | Cooling and absorption | — |
| 12 | Excess of $Cl_2$ | $H_2$ | Liquid (or gaseous) HC | $Cl_2 + H_2 \rightarrow$ HCl + $Cl_2$ in excess | Vaporization and direct chlorination of HC in chlorinated solvents (in particular CV) | Q = heavy chlorinated solvents and/or aqueous hydrochloric solution for quenching chlorination reactions to increase selectivity in particular in respect of vinyl chloride monomer |
| 13 | $Cl_2$ | $H_2$ in excess | Heavy residual chlorinated solvents | $Cl_2 + H_2 \rightarrow$ HCl + $Cl_2$ in excess ($H_2$ in excess) | Hydrogenation in the hot state in vapor phase of the heavy solvents | Q for quenching before separation |
| 14 | $Cl_2$ | $H_2$ in excess | Chlorinated solvents to be burned in secondary air | $Cl_2 + H_2 \rightarrow$ HCl + $Cl_2$ in excess ($H_2$ in excess) | Complete combustion | A = air or oxygen Q = quenching for cooling and absorption. The choice of chlorine in 3 permits an increase in the partial pressure of HCl in 11, thus facilitating the absorption in the fluid Q. |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for intimately contacting and reacting at least two disparate gaseous phases, comprising the steps of:
    A. separately establishing at least two disparate gaseous feedstreams of said at least two gaseous phases, respectively,
    B. separating each of said feedstreams into a plurality of substreams such that all of one of said gaseous phases is divided into a plurality of first substreams and all of another of said gaseous phases is divided into a plurality of second substreams, the number of said first substreams equaling the number of said second substreams,
    C. directing each of said first substreams toward a respective one of said second substreams within a chamber to combine each of said first substreams with a respective one of the second substreams at a respective separate mixing zone before said second substreams are combined with one another and before said first substreams are combined with one another, in order to establish a plurality of homogeneous blended mixtures of said first and second gaseous phases,
    D. thereafter combining together said blended mixtures to form a final mixture, and
    E. thereafter reacting said first and second gaseous phases of said final mixture.

2. The process as defined by claim 1, wherein the speed of flow of at least one of said plurality of first and second substreams being at least 3 times as great as that of its original feedstream.

3. The process according to claim 1, wherein said blended mixtures are combined by causing at least one of said substreams to travel helically.

4. The process according to claim 3, wherein said helically traveling subsream is introduced into said chamber in a generally tangential direction.

5. The process according to claim 3, wherein said final mixture passes through a restriction of said chamber.

6. The process according to claim 1, wherein walls of said chamber are maintained at a temperature such as to avoid local decomposition of any products of reaction between said gaseous phases.

7. The process according to claim 1, wherein at least one of said feedstreams comprises a hydrocarbon.

8. The process according to claim 1, wheren at least one of said feedstreams comprises chlorine gas and at least one other feedstream comprises hydrogen or a hydrocarbon.

9. The process according to claim 1, wherein at least one of said feedstreams comprises oxygen gas and at least one other of said feedstreams comprises hydrogen or a hydrocarbon.

10. Apparatus for intimately contacting and reacting at least two disparate gaseous phases, comprising:
    means for separately establishing at least two disparate gaseous feedstreams of said at least two gaseous phases, respectively,
    a chamber,
    feedstream separating means for separating each of said feedstreams into a plurality of substreams such that all of one of said gaseous phases is divided into a plurality of first substreams and all of another of said gaseous phases is divided into a plurality of second substreams, the number of said first substreams equaling the number of said second substreams,
    said feedstream separating means directing each of said first substreams toward a respective one of said second substreams within said chamber to combine each of said first substreams with a respective one of said second substreams at a respective separate mixing zone before said first substreams are combined with one another and before said second substreams are combined with one another, to establish a plurality of homogeneous blended mixtures of said first and second gaseous phases,
    combining means for combining said blended mixtures so as to form a final mixture, and
    means causing said first and second gaseous phases of said final mixture to react.

11. Apparatus according to claim 10 wherein said combining means includes means for establishing a helical flow of at least one of said substreams.

12. Apparatus according to claim 10 including means for regulating the temperature of said blended mixtures.

13. Apparatus according to claim 10 including means for separately establishing a rectilinear flow of fluid to a zone of restricted flow passage of said blended mixtures.

* * * * *